United States Patent [19]

Martinez

[11] Patent Number: 4,729,630
[45] Date of Patent: Mar. 8, 1988

[54] FIBER OPTIC TRANSDUCER

[76] Inventor: Armando S. Martinez, 515 Kelton Ave., Apt. M-9, Westwood, Calif. 90024

[21] Appl. No.: 827,971

[22] Filed: Feb. 10, 1986

[51] Int. Cl.⁴ ............................................. G02R 6/16
[52] U.S. Cl. .............................. 350/96.29; 250/231 P
[58] Field of Search .............. 73/705; 250/227, 231 P; 350/96.15, 96.20, 96.29

[56] References Cited

U.S. PATENT DOCUMENTS

| | | | |
|---|---|---|---|
| 4,358,678 | 11/1982 | Lawrence | 250/227 |
| 4,421,979 | 12/1983 | Asawa et al. | 250/227 |
| 4,436,995 | 3/1984 | Whitten | 250/227 |
| 4,459,477 | 7/1984 | Asawa et al. | 250/227 |
| 4,472,628 | 9/1984 | Whitten | 250/227 |
| 4,530,078 | 7/1985 | Lagakos et al. | 350/96.29 X |

Primary Examiner—Eugene R. LaRoche
Assistant Examiner—James C. Lee
Attorney, Agent, or Firm—Kelly, Bauersfeld & Lowry

[57] ABSTRACT

A fiber optic transducer is provided for use in remote monitoring of the position of mechanical devices, such as the position of valves used in the petroleum and chemical industries and the like. The fiber optic transducer includes a transducer frame supporting an optical fiber under conditions of predetermined bending and tension. Cam apparatus is coupled between a mechanical device to be monitored and a bending pin having a cylindrical surface bearing against the fiber to control further bending thereof in response to position changes of the mechanical device. Changes in light transmission through the fiber as a result of bending can be detected and correlated with the position of the mechanical device.

15 Claims, 5 Drawing Figures

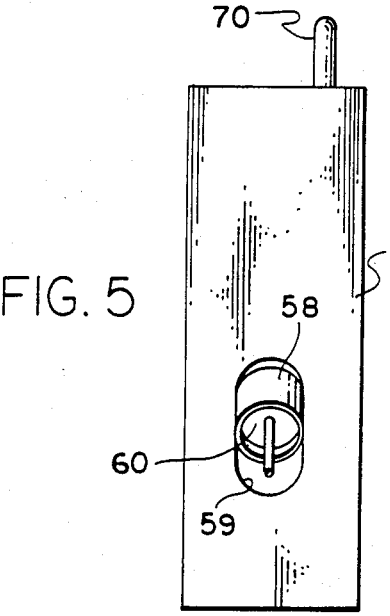
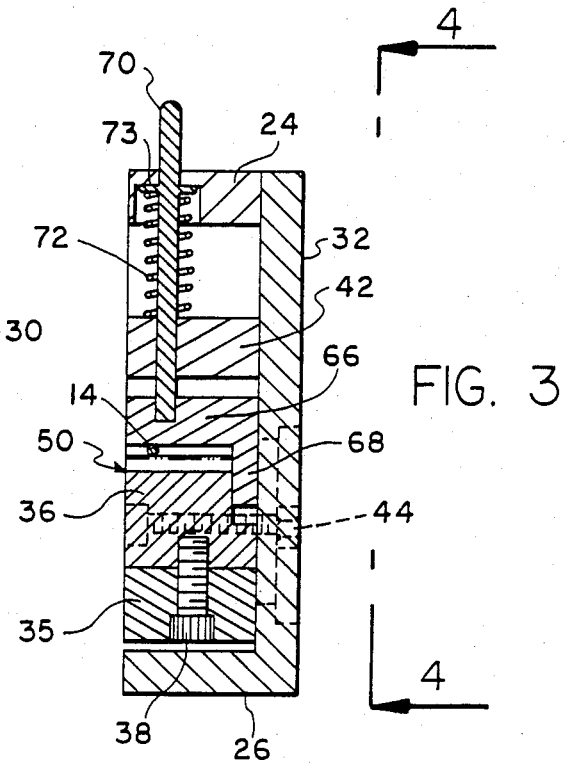
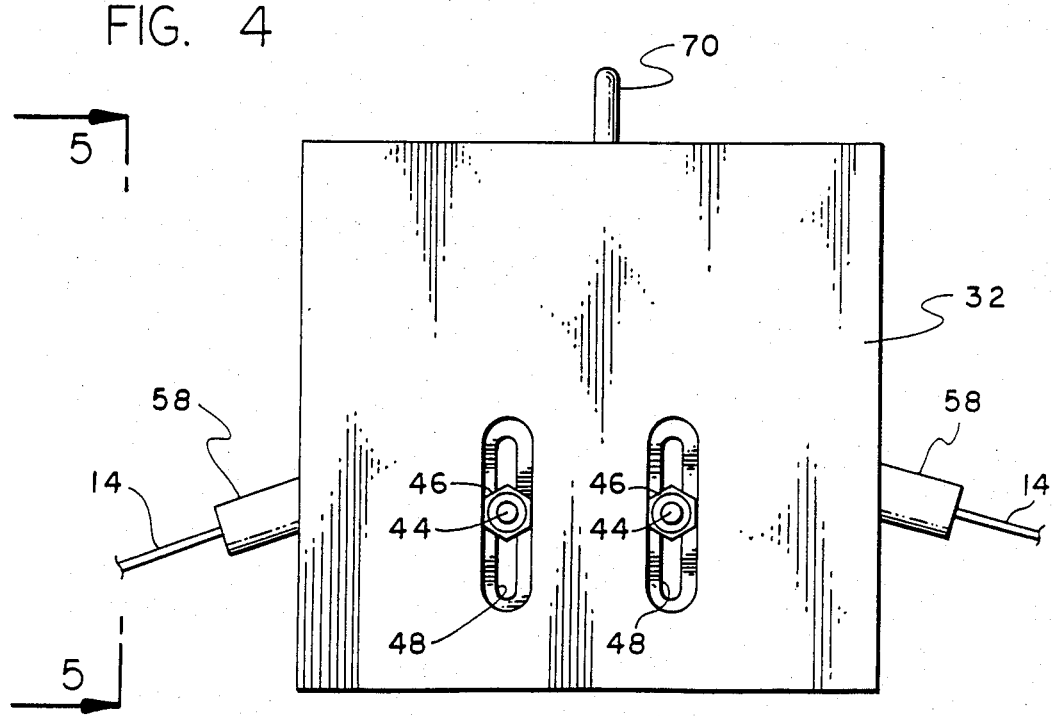

FIBER OPTIC TRANSDUCER

BACKGROUND OF THE INVENTION

This invention relates generally to transducer devices for use in monitoring the position of a mechanical device such as a valve or the like at a remote location. More particularly, this invention relates to a fiber optic transducer designed for improved and simplified remote monitoring of a mechanical device.

Remote position monitoring of mechanical devices is required or desirable in many different industrial applications. For example, in many petroleum and/or chemical processing facilities, it is frequently desirable to monitor the on-off state of various flow control valves to check proper operation of the facility. This monitoring function is preferably performed from a centralized, safe monitoring position remote from the actual valves, thereby permitting simultaneous monitoring of the facility or system by a single operator. Moreover, in some types of facilities, the nature of the materials being processed makes it necessary to avoid use of traditional transducer devices of the type requiring electrical wiring or electrical signals at the site of the valve or other mechanical devices being monitored.

In the past, some transducers have been developed utilizing an optical fiber as the primary component to indicate the position or change in position of a mechanical device. More specifically, it has been recognized that a portion of the light transmitted along an optical fiber is lost at the site of a bend in the fiber, and further that the magnitude of light loss increases directly with the magnitude of the bend. Accordingly, transducers have been constructed to bend optical fibers in response to various mechanical movements, with appropriate remote detection of transmission attenuation providing an indication of the mechanical movement. However, in such prior optical fiber transducers, accurate correlation and calibration between the light loss and the precise mechanical movement, particularly for devices such as rotary valves and the like, has not been satisfactorily obtained.

There exists, therefore, a significant need for an improved optical fiber transducer for use in providing an accurate and easily calibrated indication of mechanical position which can be monitored from a remote site. The present invention fulfills these needs and provides further related advantages.

SUMMARY OF THE INVENTION

In accordance with the invention, an improved fiber optic transducer is provided for use in monitoring the position of a mechanical device, such as a rotary valve or the like. The transducer includes a transducer frame supporting an optical fiber under conditions of predetermined bending and tension. A bending pin is disposed in variable bearing engagement with the fiber in accordance with the position of cam apparatus coupled to the mechanical device.

In one preferred form of the invention, the transducer frame includes a fiber support block adjustably positioned within an outer housing. An optical fiber is threaded laterally through the support block and across the face of a bending bridge defined by a pair of parallel convexly curved surfaces separated by an intermediate curved recess of generally the same radius of curvature. Spring means interact with the fiber to maintain the fiber under predetermined tension in intimate contact with the convex bending bridge surfaces.

The bending pin is oriented generally in parallel with the convex bridge surfaces and supported by the cam apparatus to bear against the fiber at a position between said convex bridge surfaces. The cam apparatus includes, in one preferred form, a cam follower pin adapted for springable movement away from the fiber toward a zero calibration position with reduced fiber bending, wherein the cam follower pin is adjustable to select the precise magnitude of bending at the zero calibration position. An eccentric cam lobe or the like on the mechanical device, such as the rotary shaft of a fluid flow control valve, displaces the follower pin relative to the fiber, thereby varying fiber bending as a function of valve position.

In accordance with one major aspect of the invention, it has been discovered that light losses from the fiber at the bending site are a substantially linear function of fiber displacement through a significant range of motion upon appropriate prebending and pretensioning of the fiber at the zero calibration position. Accordingly, losses of light introduced by a source into one end of the fiber can be detected at a position remote from the transducer by an appropriate optical detector to provide a direct and easily calibrated indication of the position of the valve or other mechanical device.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is a transverse sectional view taken generally on the line 3—3 of FIG. 2;

FIG. 4 is a bottom plan view taken generally on the line 4—4 of FIG. 3; and

FIG. 5 is a side elevational view taken generally on the line 5—5 of FIG. 4.

DETAILED DESCRIPTION OF THE PREFERRED EMBODIMENT

Figure 1:
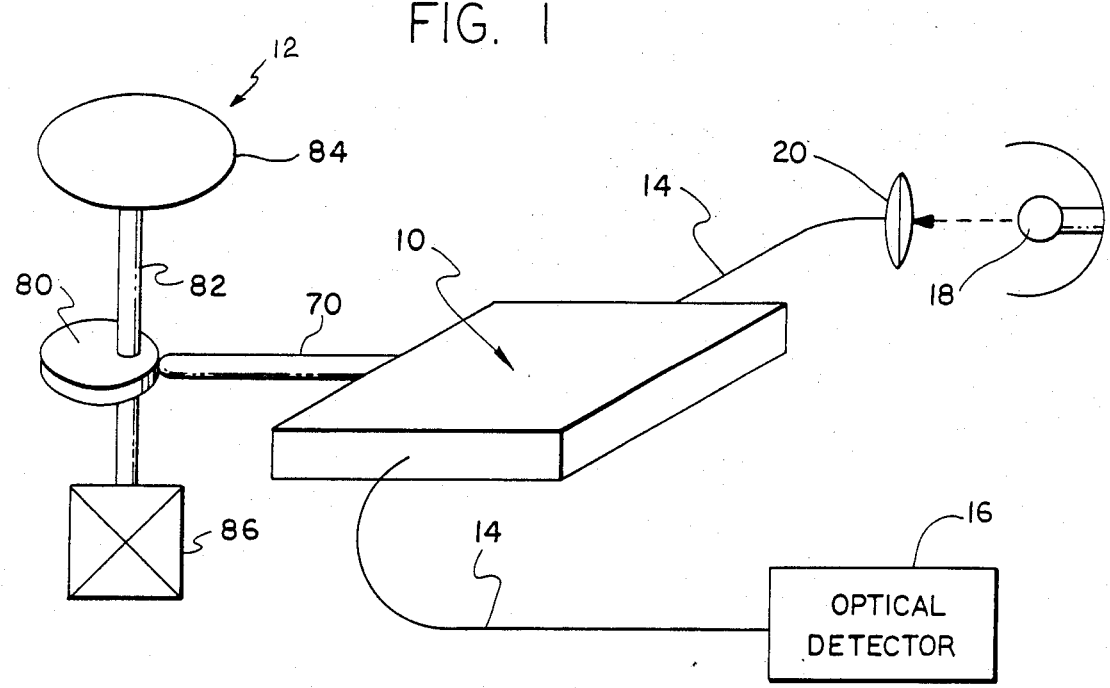
FIG. 1 is a schematic diagram generally depicting the fiber optic transducer embodying the novel features of the invention.
Figure 2:
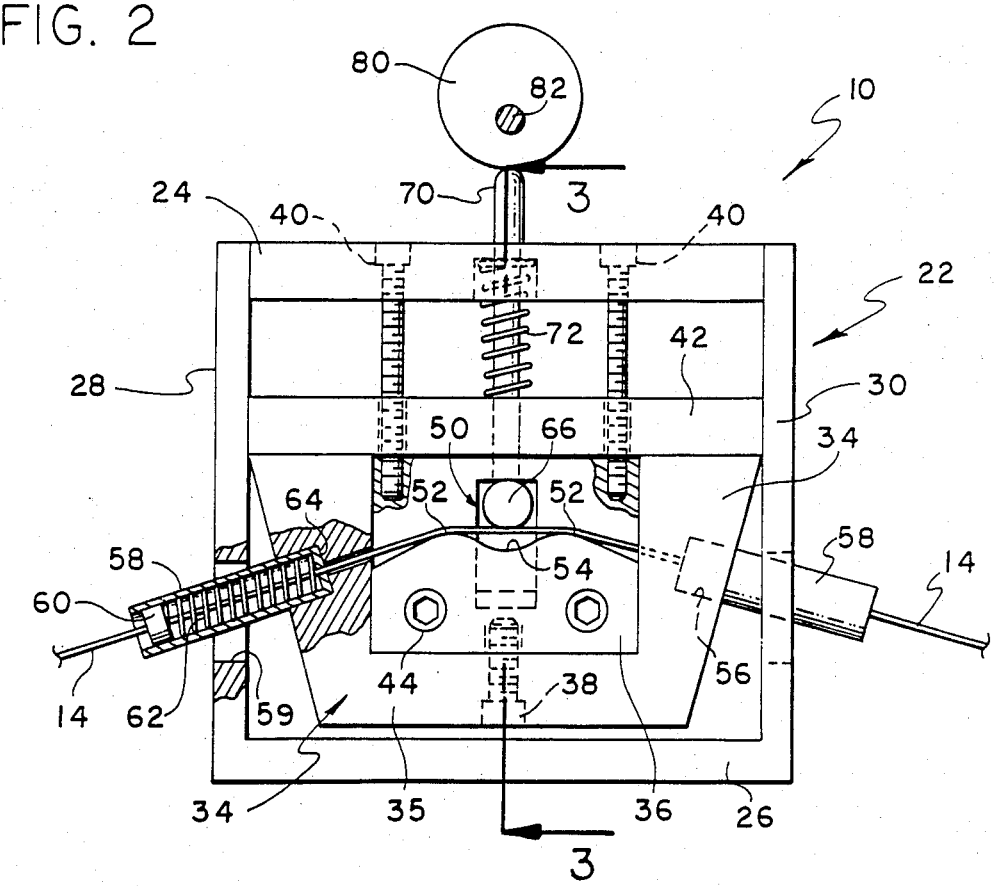
FIG. 2 is a partially fragmented top plan view illustrating one preferred form of the fiber optic transducer.

As shown in the exemplary drawings, an improved fiber optic transducer referred to generally by the reference numeral 10 is provided for use in remote monitoring of the position of a mechanical device, such as a fluid flow control valve 12 or the like. The transducer 10 includes means for supporting an optical fiber 14 under predetermined bending and tension conditions, and for variably bending the fiber in accordance with the position of the mechanical device being monitored. The magnitude of fiber bending is monitored and correlated with the position of the mechanical device by an appropriate optical detector 16 at a remote monitoring station.

The optical fiber 14 comprises a conventional light transmissive fiber of the type used in modern fiber optics technology, wherein the fiber 14 is formed to include an internal core surrounded by an external cladding having a selected lower refractive index. A source of light 18 is focused by lens 20 or the like for passage into one end of the fiber. The light is transmitted longitudinally through the fiber 14 to the opposite end thereof for detection by the optical detector 16. As is known in the art, certain types of bends along the length of the fiber result in localized light losses which can be detected and quantified by the optical detector 16. Alternate optical detection techniques such as optical time domain reflectometry may also be used if desired.

The fiber optic transducer 10 of the present invention supports a portion of the optical fiber 14 in a predetermined manner to facilitate direct and easy correlation between detected light losses due to transducer bending and the physical position of adjustment of the mechanical device 12. More particularly, it has been discovered that the bend-induced light loss in the optical fiber is a substantially linear logarithmic function of fiber displacement throughout a significant range of fiber movement, when the fiber 14 is supported under predetermined partially bent and tensioned conditions. Fiber displacement can be made to occur as a direct or known function of mechanical device position, thereby permitting detected transmission losses to be correlated with relatively simple equipment into a reading of the position of the mechanical device. This technique is particularly useful for remote monitoring of the position of a flow control valve as depicted in FIG. 1 or any other mechanical device.

As shown in more detail in FIGS. 2-5, the fiber optic transducer 10 comprises, in one preferred form, a fiber-supporting frame including a generally rectangular and open-topped housing 22. The housing 22 is defined by front and rear walls 24 and 26, together with a pair of side walls 28 and 30, all upstanding from a floor 32. A top or cover for the housing is normally provided but is not depicted in the drawings.

A fiber support block 34 is carried within the housing 22 and adjustably positioned with respect to the front wall 24 and securely anchored in place. As shown in the drawings, this support block 34 comprises a generally U-shaped outer slide member 35 having a transducer block 36 seated between the legs thereof. A locking screw 38 or other suitable fastening means is connected through the base of the slide member 35 and secured to the transducer block 36. Adjustment screws 40 extend through the front housing wall 24 and further through an intermediate wall 42 spanning the side walls for threaded connection into the transducer block 36, as viewed best in FIG. 2. Rotational adjustment of these screws 40 thus draws the transducer block 36 and slide member 35 toward or away from the front wall 24 to a selected preset or zero calibration position as will be described in more detail. When the desired zero calibration position is achieved, the transducer block 36 is securely locked in place by tightening a pair of anchoring bolts 44 passing downwardly through the block 36 and carrying nuts 46 within upwardly recessed slide tracks 48 on the underside of the housing floor 32 (FIGS. 3 and 4).

The transducer block 36 is shaped to define a contoured bending bridge 50 presented in a forward direction generally toward the front wall 24 of the housing 22. More particularly, the bending bridge 50 is defined by a plurality of generally upright curved surfaces including a pair of matching and parallel convex surfaces 52 separated by an intermediate concave or recessed surface 54. The outboard sides of the convex surfaces 52 blend with relatively straight surface sections extending laterally outwardly and angularly away from the front wall 24.

The optical fiber 14 is threaded through the transducer housing and maintained in a predetermined taut condition across the bending bridge 50. For this purpose, the opposite legs of the slide member 35 include shallow sockets 56 for seated reception of cylindrical spring housings 58 supported to extend through side wall slots 59 in a laterally outwardly and angularly rearwardly direction relative to the front wall. The optical fiber 14 is threaded through these housings 58 and has spring collars 60 secured thereto by an epoxy adhesive or the like, with compression springs 62 retained respectively between the spring collars 60 and flanged front ends 64 of the housings 58. Importantly, these spring collars 60 are positioned to maintain the fiber under tension across the bending bridge 50, with a minimum tension force of about twenty dynes being required.

A bending pin 66 is slidably supported in bearing engagement with the fiber 14 at a position between the convex surfaces 52, and at a front side of the fiber. As shown best in FIGS. 2 and 3, this bending pin has an upright cylindrical configuration for pressing and bending the fiber into the concave surface 54 of the bending bridge 50. A rearwardly extending foot 68 on the lower end of the pin 66 is received in an open lower track in transducer block to limit bending pin displacement to the fore-aft direction.

The bending pin 66 is positioned by a cam apparatus including an elongated cam follower pin 70. The rear end of the cam follower pin 70 is secured to the bending pin 66, whereas the forward end protrudes through and a short distance beyond the front wall 24. A cam spring 72 is carried about the cam follower pin 70 and rests between the intermediate wall 42 and a front flange 73 on the pin 70 to urge the pin 70 with the bending pin 66 in a forward direction away from the fiber 14. The magnitude of fiber prebending at a zero calibration position may be selected by appropriate adjustment of the adjustment screws 40, as previously described.

In use, the particular optical fiber 14 is threaded through the transducer housing 22 and adjustably set to a predetermined tension and/or predetermined bending across the bending bridge 50, preferably to a selected zero calibration position wherein a logarithmic function of light transmission losses at the bending bridge is a linear function of fiber displacement. The transducer 10 is then mounted in a position with the forward end of the cam follower pin 70 contacted by an eccentric cam 80 (FIGS. 1 and 2), for example, on the rotary shaft 82 of a flow control valve 12 or the like. A change in the operational position of the valve 12 by means of handle 84 or the like to shift the position of a valve component 86 is thus accompanied by a cam-induced motion of the cam follower pin 72. such displacement correspondingly moves the bending pin 66 to increase or decrease fiber bending. The optical detector 16 senses transmission loss changes attributat,le to the changes in fiber bending and utilizes this information to provide an accurate indication of the operational position of the valve 12. By locating the optical detector at a convenient central monitoring site remote from the valve 12, the valve 12 and many other mechanical devices can be accurately monitored.

A variety of modifications and improvements to the invention described herein are believed to be apparent to those skilled in the art. Accordingly, no limitation on the invention is intended by way of the description herein, except as set forth in the appended claims.

What is claimed is:

1. A fiber optic transducer, comprising:
   an optical fiber;
   a bending bridge having a pair of generally parallel convex surfaces separated by a concave surface;
   means for supporting a portion of said fiber under predetermined tension to extend across said bridge in engagement with said convex surfaces, said support means including a transducer housing with said bending bridge therein and having said fiber threaded therethrough, and further including spring means associated with said fiber on opposite sides of said bending bridge for applying said predetermined tension to said fiber; and
   means for bending said fiber at a position generally between said convex surfaces.

2. The fiber optic transducer of claim 1, wherein said bending means comprises a generally cylindrical bending pin oriented generally in parallel with said convex surfaces.

3. The fiber optic transducer of claim 2, wherein said bending pin includes a guide foot slidably receivable within a track formed in said bending bridge.

4. The fiber optic transducer of claim 1 wherein said predetermined tension comprises a force of at least twenty dynes.

5. The fiber optic transducer of claim 1 further including cam means for displacing said bending means.

6. The fiber optic transducer of claim I further including means for adjustably positioning said bending means to apply a prebend to said fiber.

7. The fiber optic transducer of claim 1 further including means for adjusting said bending means to a zero calibration position with light losses in the bend being a substantially linear function of fiber displacement.

8. The fiber optic transducer of claim 1 further including a source of light transmitted along said fiber and an optical detector for detecting the intensity of light transmitted along said fiber.

9. A fiber optic transducer, comprising:
   an optical fiber;
   a transducer housing having a front wall;
   a bending bridge including a fiber support block supported within said housing for adjustable movement toward and away from said front wall, said bending bridge including at least two generally parallel convex surfaces presented generally toward said front wall and separated by a concave surface;
   means for releasably locking said bending bridge in a selected position of adjustment;
   means for supporting a portion of said fiber in bearing engagement with said convex surfaces;
   means including a pair of spring assemblies carried by said support block on opposite sides of said bending bridge for applying a predetermined tension to said portion of said fiber; and
   bending means disposed generally between said fiber and said front wall for variably engaging and bending said fiber at a position between said convex surfaces.

10. The fiber optic transducer of claim 9 wherein said bending means comprises a generally cylindrical bending pin oriented generally in parallel with said convex surfaces.

11. The fiber optic transducer of claim 9 further including cam means carried by said front wall for movably positioning said bending pin.

12. A fiber optic transducer system, comprising:
   an optical fiber;
   a bending bridge having at least two generally parallel convex surfaces separated by a generally concave surface;
   means for supporting a portion of said fiber under predetermined tension extending across said bridge in bearing engagement with said convex surfaces, said supporting means including spring means associated with said fiber on opposite sides of said bending bridge for applying said predetermined tension to said fiber;
   bending means for engaging and bending said fiber at a position generally between said convex surfaces;
   a mechanical device movable to at least two different operating positions;
   cam means coupled to said mechanical device and including a cam follower movable in response to movement of said mechanical device, said cam follower being coupled to said bending means for correspondingly displacing said bending means;
   a light source for trnasmitting light along said fiber; and
   an optical detec:tor for detecting the intensity of light transmitted along said fiber.

13. The fiber optic transducer system of claim 12 further including means for adjustably positioning said bending means to apply a prebend to said fiber.

14. The fiber optic transducer system of claim 12 further including means for adjusting said bending means to a zero calibration position with light losses in the bend being a substantially linear function of fiber displacement.

15. The fiber optic transducer system of claim 12 wherein said predetermined tension comprises a force of at least twenty dynes.

* * * * *